United States Patent [19]

Barkan

[11] Patent Number: 5,103,080
[45] Date of Patent: Apr. 7, 1992

[54] DIGITIZER SIGNAL PROCESSING CIRCUIT FOR A BAR CODE

[75] Inventor: Edward Barkan, S. Setauket, N.Y.
[73] Assignee: Symbol Technologies, Inc., Bohemia, N.Y.
[21] Appl. No.: 624,947
[22] Filed: Dec. 10, 1990
[51] Int. Cl.$^5$ .............................................. G06K 5/00
[52] U.S. Cl. ..................................... 235/437; 235/462
[58] Field of Search ................. 235/436, 437, 462, 463
[56] References Cited

U.S. PATENT DOCUMENTS

| | | | |
|---|---|---|---|
| 3,751,636 | 8/1973 | Coles | 235/462 |
| 3,969,612 | 7/1976 | McJohnson | 235/462 |
| 4,000,397 | 12/1976 | Hebert et al. | 235/462 |

*Primary Examiner*—David Trafton

[57] ABSTRACT

A signal processor digitizer circuit is disclosed for reading bar code symbols by detecting the times at which a scanning light spot moves from a space onto a bar code symbol or moved from a bar code signal onto a space. The novel signal processor digitizer circuit obtains all of its information for digitizing, false transition rejections, and margin cleaning from the first derivative of an analog signal produced by a photodetector detecting the scanning light spot. The original analog signal and a second derivative signal are not used which results in several advantages. Since the original analog signal is not needed, the signal differentiator circuit is placed at a very early stage in an amplifier string. Additional amplification stages can then be used to amplify the differentiated signal until it is large enough to be digitized. This results in two benefits. The differentiator circuit effectively filters out the effects of ambient light that could otherwise cause the last amplifier stage to saturate, thereby improving ambient light immunity. It also eliminates the transient response of other forms of high pass filtering or AC coupling that are ordinarily required to improve ambient light immunity or to eliminate the build-up of large offset voltages associated with DC coupled amplifiers.

6 Claims, 3 Drawing Sheets

DIGITIZER SIGNAL PROCESSING CIRCUIT FOR A BAR CODE

BACKGROUND OF THE INVENTION

1. Field of the Invention

The present invention relates to laser scanning systems for reading bar code symbols, and more particularly, pertains to a novel digitizer processing circuit for detecting the times at which a scanning light spot moves from a space onto a bar code symbol or moves from a bar code signal onto a space.

2. Description of the Prior Art

The increased use of bar code symbols to identify products, particularly in retail businesses, has resulted in the development of various bar code reading systems. Many users of bar code readers require portable hand-held scanners which place a premium on small size, lightweight, and low power consumption requirements for the devices. One such system is a laser scanning bar code reading system as described in U.S. Pat. No. 4,496,831, commonly assigned to the same assignee as the present patent application.

The laser scanning system disclosed in U.S. Pat. No. 4,496,831 includes a portable hand-held scanning head which may be embodied in various shapes but preferably has a gun-shaped housing made of lightweight plastic. A handle and barrel portion are provided to house the various components of the scanning head therein. Within the barrel portion are mounted a miniature light source, a miniature optic train including focusing lenses and a scanning system for directing light from the light source across a bar code symbol, and miniature sensing means for detecting reflected light from the bar code symbol being scanned.

The miniature light source can comprise a laser tube such as a coaxial helium neon laser tube, or preferably a semiconductor laser diode which is considerably smaller and lighter than a laser tube, thus reducing the required size and weight of the scanning head and making the scanning head easier to handle and more maneuverable. Light generated by the light source passes through the optic train which directs the beam onto the scanning system which is mounted within the barrel portion of the scanning head. The scanning system sweeps the laser beam across the bar code symbol and comprises at least one scanning motor for sweeping the beam lengthwise across the symbol, and may comprise two motors wherein the second motor sweeps the beam widthwise across the symbol. Light reflecting means such as mirrors are mounted on the motor shafts to direct the beam through the outlet port to the symbol. A sensing circuit then detects and processes the light reflected from the symbol and generally comprises a photodetector element such as a semiconductor photodiode. The user positions the hand-held unit so the scan pattern traverses the symbol to be read, and the photodetector element produces serial electrical signals to be processed for identifying the bar code. A circuit such as that of the present invention for a digitizer signal processing circuit for a bar code produces a signal which is directed to a bar pattern decoder circuit for decoding the bar pattern. The reader unit can have a movable trigger employed to allow the user to activate the light beam and detector circuitry when pointed at the symbol to be read, thereby conserving battery life if the unit is self-powered. The lightweight plastic housing contains the laser light source, the detector, the optics, signal processing circuitry, a CPU, and a battery. The reader is designed to be aimed at a bar code symbol by the user from a position where the reader is spaced from the symbol, i.e., not touching the symbol or moving across the symbol. Typically, this type of hand-held bar code reader is specified to operate in the range of perhaps several inches.

Although the present invention is described with respect to linear or single line bar codes, it is not limited to such embodiments, and may also be applicable to more complex scanning patterns and to stacked or two dimensional bar codes such as Code 49 and similar symbologies. The present invention may also find application for use with various machine vision or optical character recognition applications in which information is derived from other types of indicia such as characters or from the surface characteristics of the article being scanned.

It is well known that it is desirable to locate in time the moment when the center of the moving scanning laser spot is located on the edge of a bar as it moves onto the bar and again when it moves off the bar. It is also well known that there is an inflection point in the analog signal that corresponds to the above-stated moments in time. Various forms of signal processing have been used in bar code scanners to locate these inflection points.

The most common technical approach to accomplish this is to use a zero crossing detector to locate when the second derivative of the analog signal crosses through zero, as this zero crossing corresponds in time to the inflection points of the analog signal. One problem with this approach is that there also are zero crossings of the second derivative that do not correspond to the inflection point of the analog signal. Various technical approaches have, therefore, been developed to distinguish between the desired zero crossings and false ones. Most of these approaches depend upon information obtained from either the analog signal or the first derivative of the analog signal. Examples of these technical approaches are disclosed in Spectra Physics Patent Nos. 4,000,397 and 4,749,879. Another known method is to offset the analog signal by half of its amplitude so that it is centered around zero and then to compare it directly to the second derivative with a voltage comparator. Another common feature is a circuit to ensure noise-free margins the white area on either side of the bar code) by setting a noise threshold based upon the averaging of noise over a period of time. Signals below this average noise level will not be digitized.

SUMMARY OF THE INVENTION

A primary object of the present invention is to provide a novel and improved signal processor digitizer circuit for reading bar code symbols by detecting the times at which a scanning light spot moves from a space onto a bar code symbol or moves from a bar code signal onto a space. The novel signal processor digitizer circuit obtains all of its information for digitizing, false transition rejections, and margin cleaning from. the first derivative of an analog signal produced by a photodetector detecting the scanning light spot. The original analog signal and a second derivative signal are not used which results in several advantages as discussed in further detail hereinbelow.

Since the original analog signal is not needed, it is possible to put the signal differentiator circuit at a very early stage in an amplifier string. Additional amplification stages can then be used to amplify the differentiated signal until it is large enough to be digitized. This results in two benefits. The differentiator circuit effectively filters out the effects of ambient light that could otherwise cause the last amplifier stage to saturate, thereby improving ambient light immunity. It also eliminates the transient response of other forms of high pass filtering or AC coupling that are ordinarily required to improve ambient light immunity or to eliminate the build-up of large offset voltages associated with DC coupled amplifiers. All of these requirements of the prior art normally result in the need for large power supply voltages to eliminate the possibility of amplifier clipping.

Therefore, in the circuit of the present invention, the digitizer and its associated amplifiers can be designed to work on low supply voltages, such as the single +5 volt supply which is almost always available for the scanner's digital decoder circuitry. This eliminates the need for expensive DC converters or other higher voltage supplies.

In accordance with the teachings herein, the present invention provides a signal processor digitizer circuit for detecting the time at which a scanning light spot moves from a space onto a bar code symbol or moves from a bar code symbol onto a space. The signal processor digitizer circuit includes a photodetector for sensing a scanning light spot scanned across and reflected by a bar code and generating an analog signal representative thereof. A differentiator circuit receives the analog signal as an input and generates a first derivative signal therefrom which is directed as an input to a delay circuit which generates a delayed first derivative signal. A peak locating comparator circuit receives the first derivative signal as a first input and the delayed first derivative signal as a second input, and detects transitions of the two signals. A false transition gating circuit is provided for discriminating against false transition signals, and changes states only upon the detection of transition signals above a given threshold. An output circuit receives a first input from the peak locating comparator circuit and a second input from the false transition gating circuit, and changes the state of its output signal only if the false transition gating comparator circuit has changed state since the last change of state of the peak locating comparator to discriminate against false transition signals.

In greater detail, the output circuit also includes a margin threshold detecting circuit which receives the first derivative signal as an input and functions as a retriggerable one shot circuit. The margin threshold detecting circuit does not time out as long as the first derivative signal includes a series of pulses that exceed the threshold of the margin threshold detecting circuit, but upon time out prevents the output circuit from passing an output signal. The level at which the false transition gating comparator circuit exceeds a threshold is determined by a level of hysteresis resulting from a positive feedback thereof. Moreover, an amplifier with low pass filtering is coupled to the output of the differentiation circuit and provides amplification and low pass filtering for the first derivative signal.

BRIEF DESCRIPTION OF THE DRAWINGS

The foregoing objects and advantages of the present invention for a digitizer signal processing circuit for a bar code may be more readily understood by one skilled in the art with reference being had to the following detailed description of a preferred embodiment thereof, taken in conjunction with the accompanying drawings, wherein like elements are designated by identical reference numerals throughout the several views, and in which:

FIG. 2 illustrates a set of waveforms which are useful and instructional in explaining the operation of the circuit of FIG. 1, and in which:

FIG. 2A illustrates a representative waveform of a detected original analog signal;

FIG. 2B illustrates waveforms of a first derivative signal and a delayed first derivative signal derived from the original analog signal of FIG. 2A;

FIG. 2C illustrates the output signal of the peak locating comparator circuit produced for the two signals of FIG. 2B;

FIG. 2D illustrates the output signal of the false transition gating comparator circuit produced for the signals of FIGS. 2A, 2B and 2C;

FIG. 2E illustrates the digitized bar output signal from the latch comparator circuit produced for the signals of FIGS. 2A, 2B, 2C and 2D;

FIG. 2F illustrates the output signal of the margin threshold circuit; and

DETAILED DESCRIPTION OF THE DRAWINGS

Figure 1:
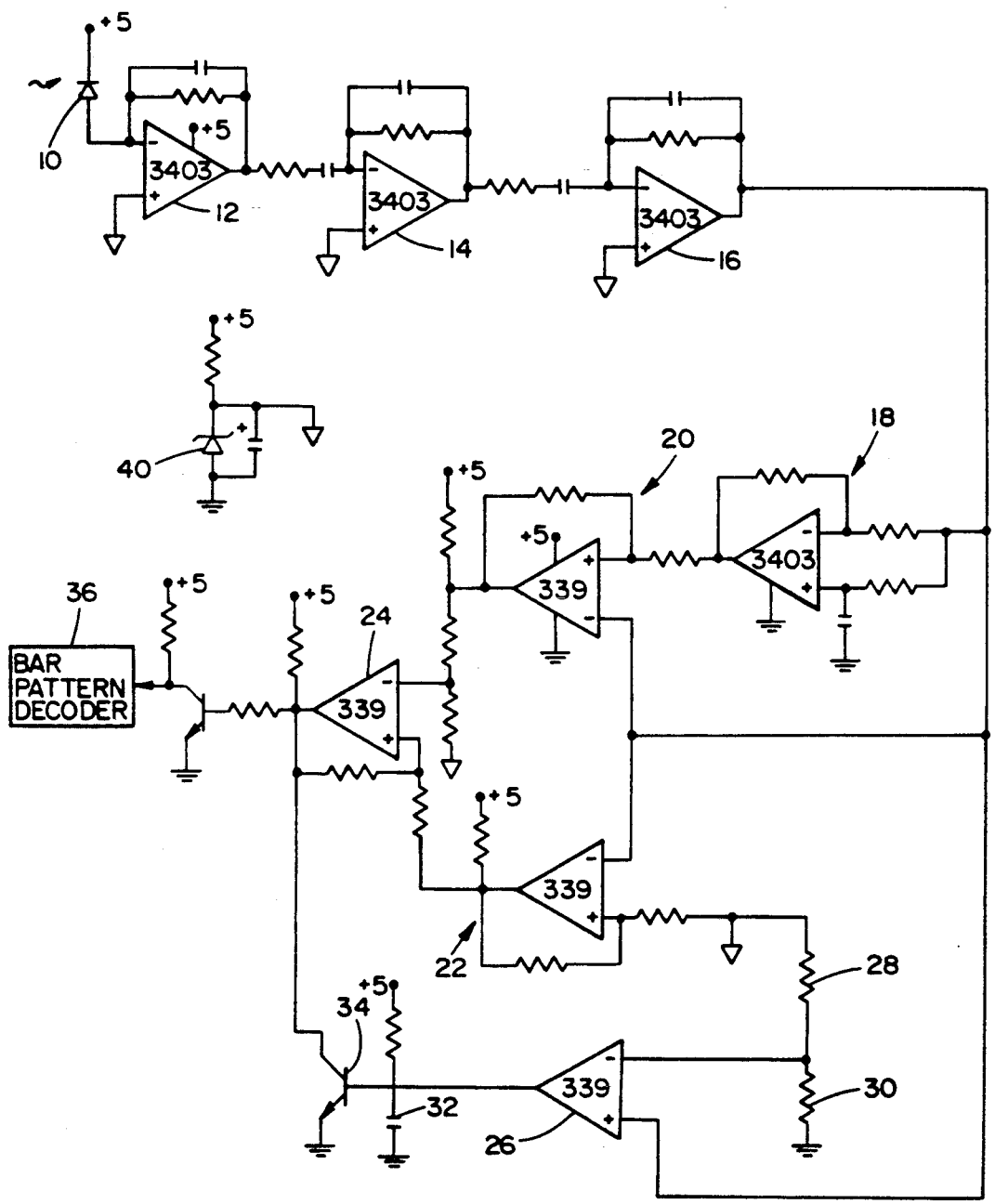
FIG. 1 is a block schematic diagram of an exemplary embodiment of a digitizer signal processing circuit for a bar code designed pursuant to the teachings of the present invention.

Referring to the drawings in detail, light from a scanning light spot reflected from the bar code pattern is detected by a photodiode 10 which produces an electrical current proportional thereto. The current is processed through a current to voltage converter circuit 12 which produces a voltage proportional to the input current. The voltage input signal is then directed to a differentiator circuit 14 which produces a first time derivative signal of the analog voltage input signal, FIG. 2A. The first derivative signal outputted by differentiator circuit 14 is then amplified and filtered by an amplifier 16 with low pass filtering.

After the differentiated signal has been amplified at 16, the circuit functions as follows. The amplified, differentiated signal is fed to a delay circuit 18, producing a delayed signal, FIG. 2B. A peak locating comparator 20 compares the differentiated signal to the delayed output signal of the delay circuit. Referring to the waveforms of FIG. 2B, there is a crossing of these two signals approximately one delay period after a peak, resulting in a transition in the output of the peak locating comparator, FIG. 2C. If the output of a false transition gating comparator 22 has changed state, FIG. 2D, since the last change of state of the peak locating comparator 20, a latch comparator circuit 24 will change state, FIG. 2E. In other words, the latch comparator circuit 24 only changes state upon the first transition of the peak comparator 20 following a transition of the gating comparator 22. In this way, noise that might cause spurious transitions on the output of the peak location comparator 20 do not cause false transitions on the latch comparator 24 output unless the noise is large enough to trip the gating comparator 22.

The level at which the gating comparator 22 trips is determined by the amount of hysteresis so as to ensure maximum digitizing accuracy.

The margin threshold of a margin threshold circuit 26 is set to be a fixed DC voltage below zero. The margin threshold circuit 26 receives as an input voltage pulses from the first differential signal, the amplitudes of which are determined by a voltage divider comprising resistors 28 and 30. The margin threshold circuit 26 acts like a retriggerable one shot that does not time out as long as there is a continuous series of pulses in the first differential signal that exceed the threshold. When the pulses stop long enough for the circuit to time out, the digitized bar output is forced back to the white (space) state. When a border area is encountered, the output of margin threshold circuit 26 is high, see FIG. 2F, charging a capacitor 32 which turns an inverting transistor 34 on, thereby not allowing latch comparator 24 to pass an output. When a bar code symbol is scanned, the output of threshold circuit 26 is low, see FIG. 2F, discharging capacitor 32 and turning inverting transistor 34 off, which allows latch comparator 24 to pass an output.

The output of latch comparator 24 is directed to a bar pattern decoder circuit 36, which it can drive directly in some embodiments. Alternatively, as illustrated in FIG. 1, when the latch comparator 24 is connected to the bar pattern decoder through an output cable which presents some capacitance to the circuit, an inverting transistor amplifier 38 can couple the output of latch comparator 24 to the bar pattern decoder circuit 36.

Figure 2:
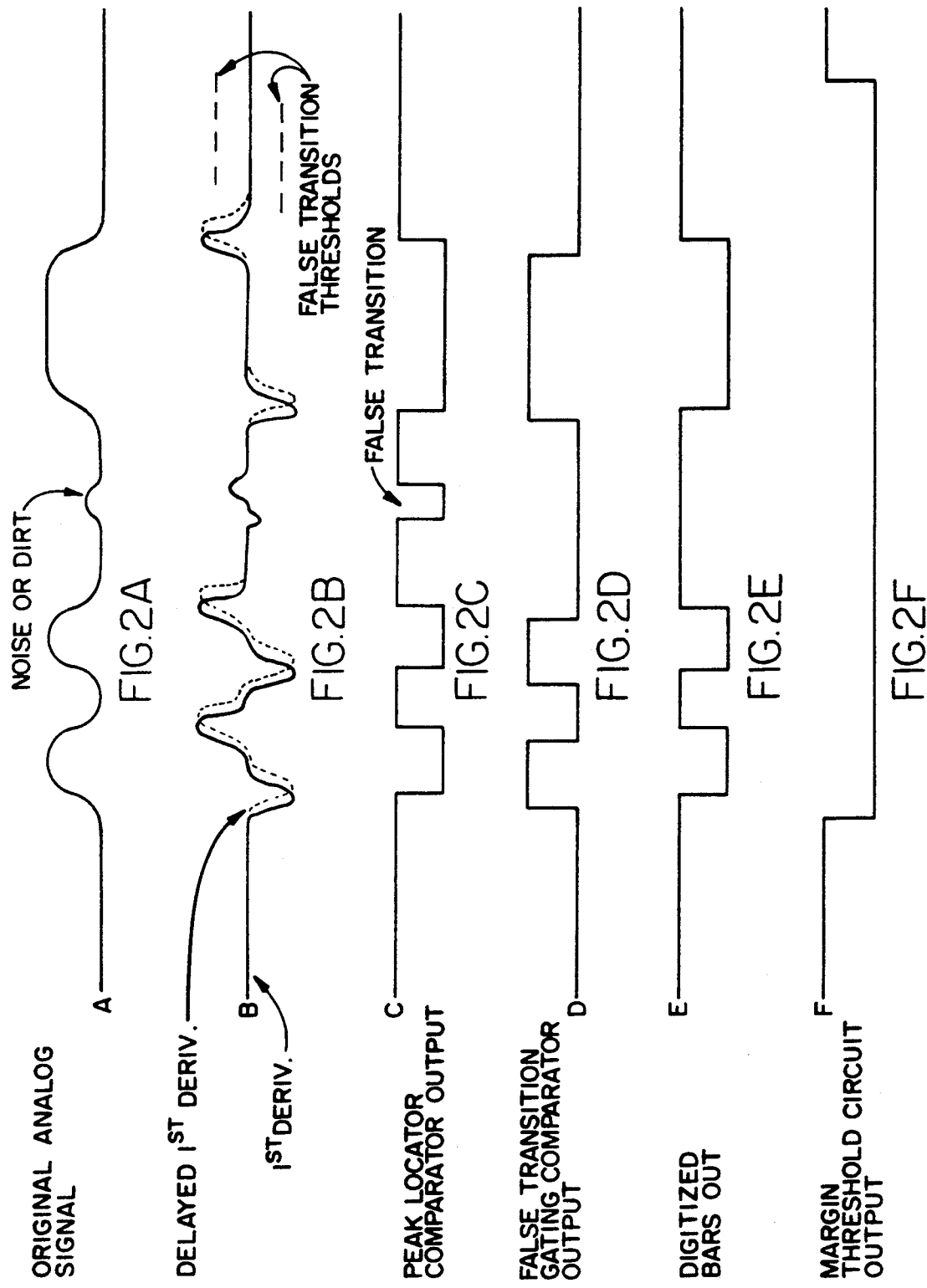

FIG. 2 also illustrates a zener diode 40 circuit which can advantageously be coupled to the circuit described hereinabove to ensure that the signal levels therein are centered at 2.5 V, and which can be considered to be part of the power supply circuit.

This circuit of the present invention performs a similar function to those of previous circuits, but in different and simpler ways. For example, all previous prior art circuits use either the undifferentiated analog signal (for windows or ambient light rejection) or the second derivative signal (for zero crossings). The circuit of the subject invention utilizes neither of these signals in the signal processing except to derive the first differential signal. The circuit of the subject invention is the only known circuit that determines windows with a single comparator 22. A high to low transition of the gating comparator 22 enables the latch comparator 24 to respond to the first, and only the first, low to high transition of the peak locating comparator 20, and a low to high transition of the gating comparator 22 enables the latch comparator 24 to respond to the first, and only the first, high to low transition of the peak locating comparator 20. In contrast therewith, other prior art circuits create narrow windows around the time period that a real bar-space or space-bar transition is expected. There is always one window for bar-space transitions and another window for space-bar transitions.

The circuit of the present invention is the only known circuit of the type described hereinabove to use the separate margin comparator 26 coupled as explained hereinabove to provide increased noise immunity in the margin, and it is the only known circuit that does not use diode based peak detectors which limit how small a signal can be processed, and makes it difficult to use a single, low voltage power supply.

Figure 3:
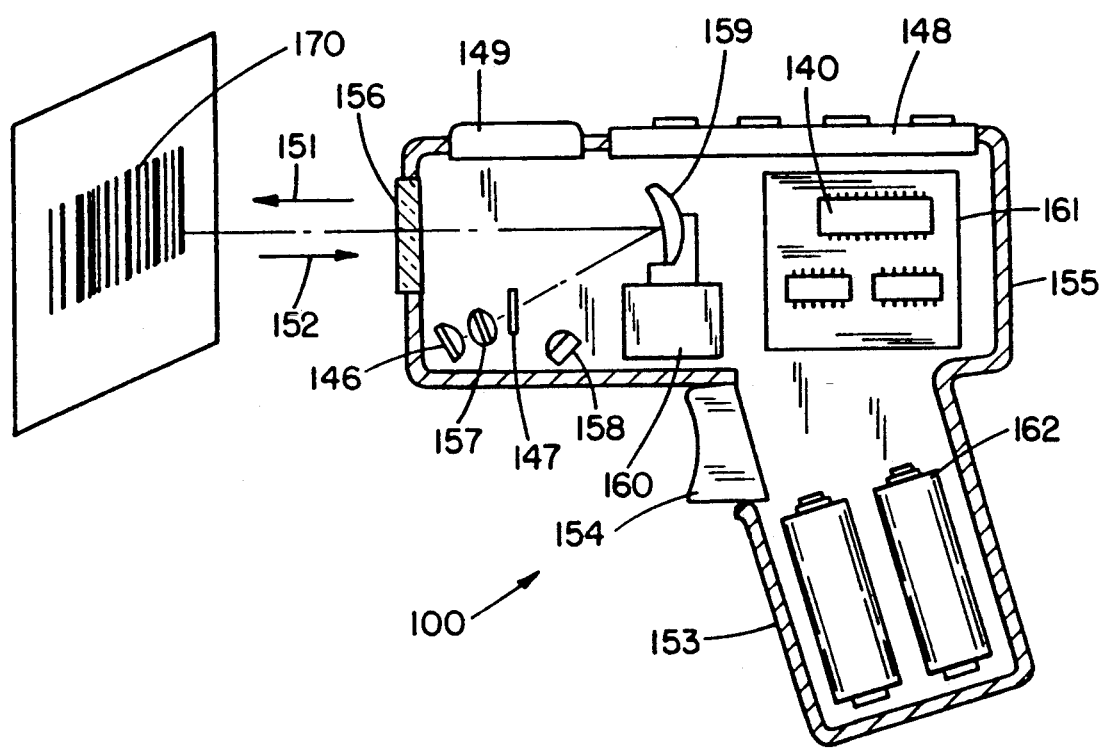
FIG. 3 illustrates a highly simplified embodiment of one type of bar code reader which can be utilized in association with the circuit of the present invention.

FIG. 3 illustrates a highly simplified embodiment of one type of bar code reader that may be utilized in association with the digitizer signal processing circuit of the present invention. A reader 100 may be implemented in a hand-held scanner, as illustrated, or a desktop workstation or stationery scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

This hand-held device of FIG. 1 is generally of the style disclosed in U.S. Pat. 4,760,248 issued to Swartz, et al., or in U.S. Pat. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 1. These Pat. Nos. 4,760,248, 4,896,026 and 4,409,470 are incorporated herein by reference, but the general design of such devices will be briefly described here for reference.

Turning to FIG. 3 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected light 152 from the symbol is detected by a light-responsive device 158 in the reader unit, producing serial electrical signals to be processed and decoded for reproducing the data represented by the bar code.

In a preferred embodiment, the reader unit 100 is a gun shaped device, having a pistol-grip type of handle 153 and movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

As further depicted in FIG. 3, a suitable lens 157 (or multiple lens system) may be used to focus the scanned beam into the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159 which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

While several embodiments and variations of the present invention for a digitizer signal processing circuit for a bar code are described in detail herein, it should be apparent that the disclosure and teachings of the present invention will suggest many alternative designs to those skilled in the art.

What is claimed is:

1. A signal processor digitizer circuit for detecting the time at which a scanning light spot moves from a space onto a bar code symbol or moves from a ar code symbol onto a space, comprising:
   a) a photodetector means for sensing a scanning light spot scanned across and reflected by a bar code and generating an analog signal representative thereof;
   b) a differentiator circuit means receiving the analog signal as an input and generating a first derivative signal of the analog signal;
   c) a delay circuit means receiving the first derivative signal as an input and generating a delayed first derivative signal;
   d) a peak locating comparator circuit means receiving the first derivative signal as a first input and the delayed first derivative signal as a second input, and detecting crossings of the first derivative signal and the delayed first derivative signal when the signals are equal, which result in transitions in the output signal of the peak locating comparator circuit means;
   e) a false transition gating circuit means for discriminating against false transitions in the output signal of the peak locating comparator circuit means and changing states only upon the detection of transitions in the output signal of the peak locating comparator circuit means about a given threshold; and
   f) an output circuit means receiving a first input from the peak locating comparator circuit means and a second input from the false transition gating circuit means, and changing the state of its output signal only if the false transition gating circuit means has changed state since the last change of state of the peak locating comparator circuit means to discriminate against false transition signals.

2. A signal processor digitizer circuit as claimed in claim 1, wherein said output circuit means further includes a margin threshold detecting circuit receiving the first derivative signal as an input and functioning as a retriggerable one shot circuit which does not time out as long as the first derivative signal includes a series of pulses that exceed the threshold of the margin threshold detecting circuit, but upon time out prevents the output circuit means from passing an output signal.

3. A signal processor digitizer circuit as claimed in claim 2, wherein the level at which said false transition gating circuit means exceeds a threshold is determined by the level of hysteresis resulting from a positive feedback therein.

4. A signal processor digitizer circuit as claimed in claim 3, further including an amplifier with low pass filtering coupled to the output of said differentiator circuit means and amplification and low pass filtering for the first derivative signal.

5. A signal processor digitizer circuit as claimed in claim 1, wherein the level at which said false transition gating circuit means exceeds a threshold is determined by the level of hysteresis resulting from a positive feedback therein.

6. A signal processor digitizer circuit as claimed in claim 1, further including an amplifier with low pass filtering coupled to the output of said differentiator circuit means and providing amplification and low pass filtering for the first derivative signal.

* * * * *